United States Patent
Lotz et al.

(10) Patent No.: US 11,970,573 B2
(45) Date of Patent: *Apr. 30, 2024

(54) BIFURAN-MODIFIED POLYESTERS

(71) Applicants: ExxonMobil Chemical Patents Inc., Baytown, TX (US); Virginia Tech Intellectual Properties, Inc., Blacksburg, VA (US)

(72) Inventors: Monica Lotz, Houston, TX (US); S. Richard Turner, Blacksburg, VA (US); Hans Eliot Edling, Radford, VA (US); Kapil Kandel, Humble, TX (US); Michael Salciccioli, Ann Arbor, MI (US); Stephen Cohn, Spring, TX (US); Alan A. Galuska, Ellijay, GA (US); Javier Guzman, Kingwood, TX (US); Edward E. Paschke, Galena, IL (US)

(73) Assignees: ExxonMobil Chemical Patents Inc., Baytown, TX (US); Virginia Tech Intellectual Properties, Inc., Blacksburg, VA (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/227,662

(22) PCT Filed: Nov. 13, 2019

(86) PCT No.: PCT/US2019/061072
§ 371 (c)(1),
(2) Date: Apr. 12, 2021

(87) PCT Pub. No.: WO2020/106511
PCT Pub. Date: May 28, 2020

(65) Prior Publication Data
US 2022/0033573 A1    Feb. 3, 2022

Related U.S. Application Data

(60) Provisional application No. 62/770,069, filed on Nov. 20, 2018.

(51) Int. Cl.
*C08G 63/193* (2006.01)
*C08G 63/80* (2006.01)
*C08G 63/85* (2006.01)

(52) U.S. Cl.
CPC ........... *C08G 63/193* (2013.01); *C08G 63/80* (2013.01); *C08G 63/85* (2013.01); *C08G 2120/00* (2013.01)

(58) Field of Classification Search
CPC ............ C08G 2120/00; C08G 2250/00; C08G 63/181; C08G 63/185; C08G 63/193; C08G 63/199; C08G 63/78; C08G 63/80; C08G 63/85
See application file for complete search history.

(56) References Cited

U.S. PATENT DOCUMENTS

| 4,093,603 | A | 6/1978 | Jackson, Jr. et al. |
| 7,396,896 | B2 | 7/2008 | Kurian |
| 9,527,952 | B1* | 12/2016 | Sucheck ............... C08G 63/16 |
| 9,908,968 | B2 | 3/2018 | Kolstad et al. |
| 2010/0143546 | A1 | 6/2010 | Kriegel et al. |
| 2021/0009545 | A1* | 1/2021 | Kandel ................ C07D 407/14 |
| 2021/0355271 | A1* | 11/2021 | Lotz ..................... C08G 63/181 |
| 2022/0340707 | A1* | 10/2022 | Heiskanen ........... C08G 63/185 |

FOREIGN PATENT DOCUMENTS

| JP | 2018150415 A | 9/2018 |
| JP | 6577484 B2 | 9/2019 |
| TW | 381104 B | 2/2000 |
| WO | 2015137806 A1 | 9/2015 |
| WO | 2015137807 A1 | 9/2015 |
| WO | 2018071383 A1 | 4/2018 |

OTHER PUBLICATIONS

Naoki Miyagawa et al "Preparation of Furan Dimer-based Biopolyester Showing High Melting Points", Chem. Lett. 2017, 46, 1535-1538, published Aug. 2017 (Year: 2017).*

(Continued)

*Primary Examiner* — Frances Tischler
*Assistant Examiner* — Gennadiy Mesh
(74) *Attorney, Agent, or Firm* — Daniel N. Lundeen; Lundeen & Lundeen PLLC

(57) ABSTRACT

Bifuran-modified polyester, polyethylene-terephthalate-co (2,2'-bifuran-5,5'-dicarboxylate), prepared by esterifying or transesterifying a diacid component comprising from 2 to 10 mole percent 2,2'-bifuran-5,5'-dicarboxylate and a diol component with a catalyst compound comprising metal present in an amount of from about 10 to about 450 ppm and polycondensation to form the polyester wherein the polyester has an inherent viscosity of at least 0.5 g/dL, a glass transition temperature (Tg) of 82° C. or more, a semicrystalline melting peak (Tm) with ΔHf equal to or greater than 5 J/g on the second heating ramp, and melting temperature ($T_m$) between 229° C. and 246° C. Reinforced compositions and shaped articles comprising bifuran-modified polyethylene terephthalate and methods of their production are also disclosed.

15 Claims, No Drawings

(56) References Cited

OTHER PUBLICATIONS

Tuomo P. Kainulainen et al "UV-Blocking Synthetic Biopolymer from Biomass-Based Bifuran Diester and Ethylene Glycol", Macromolecules 2018, 51, 1822-1829, Published: Feb. 21, 2018 (Year: 2018).*

Majdi Abid et al "Copolyesters Containing Terephthalic and Bio-Based Furanic Units by Melt-Polycondensation", Macromol. Mater. Eng. 2008, 293, 39-44 (Year: 2008).*

Vishwanath Gaitonde et al "Bio-Based Bisfuran: Synthesis, Crystal Structure and Low Molecular Weight Amorphous Polyester", Tetrahedron Lett. Jul. 23, 2014; 55(30): 4141-4145 (Year: 2014).*

Steven K. Burgess et al "Chain Mobility, Thermal, and Mechanical Properties of Poly(ethylene furanoate) Compared to Poly(ethylene terephthalate)", Macromolecules 2014, 47, 1383-1391 (Year: 2014).*

Lu Wang et al "Streamlined Synthesis of Biomonomers for Bioresourced Materials: Bisfuran Diacids, Diols, and Diamines via Common Bisfuran Dibromide Intermediates", Ind. Eng. Chem. Res. 2017, 56, 11380-11387 (Year: 2017).*

Jawed Asrar "Synthesis and Properties of 4,4-Biphenyldicarboxylic Acid and 2,6-Naphthalenedicarboxylic Acid", Journal of Polymer Science: Part A: Polymer Chemistry, vol. 37, 3139-3146 (1999) (Year: 1999).*

Maria Konstantopoulou et al "Poly(ethylene furanoate-co-ethylene terephthalate) biobased copolymers: Synthesis, thermal properties and cocrystallization behavior", European Polymer Journal 89 (2017) 349-366 (Year: 2017).*

* cited by examiner

BIFURAN-MODIFIED POLYESTERS

CROSS REFERENCE TO RELATED APPLICATION(S)

This application is a national stage entry of PCT/US2019/061072, filed Nov. 13, 2019, which claims the benefit of and priority to U.S. Ser. No. 62/770,069, filed Nov. 20, 2018.

THE NAMES OF PARTIES TO A JOINT RESEARCH AGREEMENT

ExxonMobil Chemical Company, a division of Exxon-Mobil Corporation, and Virginia Polytechnic Institute and State University.

BACKGROUND OF THE INVENTION

There is a strong drive in the polyester industry to enhance the properties of widely commercialized polyesters such as polyethylene terephthalate (PET). Current polyesters can have limited applications or reduced processing throughput due to inherent properties of the material, e.g., low glass transition temperature ($T_g$), barrier properties, tensile modulus, ductility, etc. Environmental concerns also drive the incorporation of biosourced monomers into polyesters. However, many times biosourced monomers lead to polyesters with reduced property profiles, e.g., glass transition temperature ($T_g$), tensile modulus, brittleness, etc., relative to incumbent commercial polyesters.

Poly(ethylene 2,2'-bifuran-5,5'-dicarboxylate) (PEBF) was reported in Kainulainen et al., *Macromolecules*, 2018, 51(5), pp. 1822-1829, to have a somewhat higher tensile modulus relative to PET; however, the gains were only modest and the PEBF films were extremely brittle relative to PET. Moreover, the PEBF did not suitably crystallize and exhibited no melting peak ($T_m$) in the reheat cycle of differential scanning calorimetry (DSC), even though 1 mol % titanate catalyst was used that should have provided nucleation sites for crystallization.

The industry is in need of biosourced monomers that could provide performance enhancements, e.g., $T_g$, tensile modulus, barrier properties, crystallinity, and/or impact strength of polyesters; expand the application of current polyesters; and/or provide more environmentally sustainable copolyesters.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Modifying conventional polyesters, such as polyethylene terephthalate (PET), polyethylene furanoate (PEF), polyethylene naphthalate (PEN), and so on, by incorporating bifuran monomers such as dimethyl-2,2'-bifuran-5,5'-dicarboxylate (BFE), 2,2'-bifuran-5,5'-dicarboxylic acid (BFA), or bis(2-hydroxyethyl)-2,2'-bifuran-5,5'-dicarboxylate (BHEB), can modify properties of the polyester, such as glass transition temperature ($T_g$), tensile modulus, barrier properties, crystallinity, and/or impact strength. For example, the incorporation of BFA or BFE leads to significantly enhanced glass transition ($T_g$) compared to conventional EG based polyesters made with terephthalic acid (TPA) or isophthalic acid (IPA). Thus, the addition of 1-50 percent by weight of the BFA into conventional PET, PEF, or PEN, may increase the use temperature of the polyester.

In one aspect, the present invention provides a polyester comprising a diacid component and a diol component, wherein the diacid component, the diol component, or a combination thereof, comprise a bifuran comonomer selected from bifuran polycarboxylates, bifuran polyhydroxyls, and combinations thereof, in an amount of from 1 to 50 weight percent based on the total weight of the polyester.

In any embodiment, the bifuran comonomer can comprise a bifuran diacid, a bifuran diester, a diol bifuran diester, an ester forming equivalent thereof, or a combination thereof. The bifuran diacid preferably comprises 2,2'-bifuran-5,5'-dicarboxylic acid (BFA). The bifuran diester preferably comprises dialkyl-2,2'-bifuran-5,5'-dicarboxylate, such as, for example, dimethyl-2,2'-bifuran-5,5'-dicarboxylate (BFE). The diol bifuran diester preferably comprises a di(hydroxyalkyl) bifuranoate, such as, for example, bis(2-hydroxyethyl)-2,2'-bifuran-5,5'-dicarboxylate (BHEB). Ester-forming equivalents can include the corresponding acid halides, esters, half-esters, salts, half-salts, anhydrides, and mixed anhydrides.

In another aspect, embodiments according to the present invention can include a method of making a bifuran-modified polyester, comprising: esterifying or transesterifying monomers comprising a diacid component and a diol component, optionally in the presence of a catalyst; wherein the monomers further comprise a bifuran comonomer; and polycondensing the esterified or transesterified monomers, optionally in the presence of the catalyst, to form a bifuran-modified polyester comprising the diacid component, the diol component, and the bifuran comonomer, wherein the bifuran comonomer is present in an amount from 1 to 50 weight percent based on the total weight of the bifuran-modified polyester.

DETAILED DESCRIPTION OF THE PREFERRED EMBODIMENTS

Throughout the entire specification, including the claims, the following terms shall have the indicated meanings.

The term "and/or" refers to both the inclusive "and" case and the exclusive "or" case, and such term is used herein for brevity. For example, a composition comprising "A and/or B" may comprise A alone, B alone, or both A and B.

Unless otherwise stated, the percentages of monomers are expressed herein as mole percent (mol %) based on the total moles of monomers present in the reference polymer or polymer component. All other percentages are expressed as weight percent (wt %), based on the total weight of the particular composition present, unless otherwise noted. Room temperature is 23° C. and atmospheric pressure is 101.325 kPa unless otherwise noted.

The term "consisting essentially of" in reference to a composition is understood to mean that the composition can include additional compounds other than those specified, in such amounts to the extent that they do not substantially interfere with the essential function of the composition, or if no essential function is indicated, in any amount up to 2 percent by weight of the composition.

For purposes herein, a "polymer" refers to a compound having two or more "mer" units, that is, a degree of polymerization of two or more, where the mer units can be of the same or different species. As discussed below, polyester mer units are carboxylic acid-hydroxyl functional esters derived from a diacid and a diol.

Unless otherwise indicated, reference to a polymer herein includes a homopolymer, a copolymer, a terpolymer, or any polymer comprising a plurality of the same or different species of repeating units. A "homopolymer" is a polymer having mer units or residues that are the same species, e.g., a homopolyester has ester residues derived from a single diacid and a single diol. A "copolymer" is a polymer having two or more different species of mer units or residues, e.g., a copolyester has more than one species of ester residues derived from more than one diacid and/or more than one diol. A "terpolymer" is a polymer having three different species of mer units. "Different" in reference to mer unit species indicates that the mer units differ from each other by at least one atom or are different isomerically.

The term "polyester," as used herein, refers to a polymer comprised of residues derived from one or more polyfunctional acid moieties, collectively referred to herein as the "diacid component," in ester linkage with residues derived from one or more polyhydroxyl compounds, which may also be referred to herein as "polyols" and collectively as the "diol component." As used herein, "diacid" and "diol" refer to polyfunctional acids and hydroxyls having two or more than two acid and hydroxyl functional groups, respectively. The term "repeating unit," also referred to as the "mer" units, as used herein with reference to polyesters refers to an organic structure having a diacid component residue and a diol component residue bonded through a carbonyloxy group, i.e., an ester linkage. Reference to the equivalent terms "copolyesters" or "(co)polyesters" or "polyester copolymers" herein is to be understood to mean a polymer prepared by the reaction of two or more different diacid compounds or ester producing equivalents thereof that incorporate different diacid residues into the backbone, and/or two or more different diol compounds that incorporate different diol residues into the backbone, i.e., either one or both of the diacid and diol components incorporate a combination of different species into the polymer backbone.

As used herein, the prefixes di- and tri-generally refer to two and three, respectively, with the exception of diacid and diol components noted herein. Similarly, the prefix "poly-" generally refers to two or more, and the prefix "multi-" to three or more. The carboxylic acids and/or esters used to make the copolyesters, or the residues of which are present therein, are collectively referred to herein as the "diacid component," including both difunctional and multifunctional species thereof, or simply as the "acid component;" and likewise the hydroxyl compounds used to make the copolyesters, or the residues of which are present therein, are collectively referred to herein as the "diol component," including both difunctional and multifunctional species thereof, or simply as the hydroxyl or polyol component.

The polycarboxylic acid residues, e.g., the dicarboxylate mer units, may be derived from a polyfunctional acid monomer or an ester producing equivalent thereof. Examples of ester producing equivalents of polyfunctional acids include one or more corresponding acid halide(s), ester(s), salts, the anhydride, or mixtures thereof. As used herein, therefore, the term "diacid" is intended to include polycarboxylic acids and any derivative of a polycarboxylic acid, including its associated acid halides, esters, half-esters, salts, half-salts, anhydrides, mixed anhydrides, or mixtures thereof, capable of forming esters useful in a reaction process with a diol to make polyesters.

The term "residue," as used herein, means the organic structure of the monomer in its as-polymerized form as incorporated into a polymer, e.g., through an esterification, transesterification, and/or polycondensation reaction from the corresponding monomer(s). Throughout the specification and claims, reference to the monomer(s) in the polymer is understood to mean the corresponding as-polymerized form or residue of the respective monomer. For purposes herein, it is to be understood that by reference to a copolyester comprising a diacid component and a diol component, the diacid and diol components are present in the polymer in the as-polymerized (as-condensed) form. For example, the diacid component is present in the polymer as dicarboxylate in alternating ester linkage with the diol component, yet the polyester may be described as being comprised of, for example, the dicarboxylic acid or dicarboxylic acid alkyl ester and diol, where it is understood the alkyl ester groups in the starting material are not present in the polyester. For example, in terephthalic acid-ethylene glycol polyester or dimethyl terephthalate-ethylene glycol polyester, it is understood the acid or methyl ester groups in the starting material are not present in the polyester.

Mole percentages of the diacid and diol components are expressed herein based on the total moles of the respective component, i.e., the copolyesters comprise 100 mole percent of the polyfunctional acid component and 100 mole percent of the polyfunctional hydroxyl component. For purposes herein, when a composition specifies a component, for example, a diacid component, having a particular mole percent of a first compound with the balance or remainder of another compound or mixture of compounds, it is to be understood that the balance refers to the amount of the second compound necessary to equal 100 mole percent of that component, based on the total number of moles of all diacid compounds present, typically in polymerized form in the resultant copolyester. For example, a copolyester having a first diacid "A" from 30 to 60 mole percent with the balance being the second diacid component "B" refers to a copolyester comprising 30 to 60 mole percent diacid A and 70 to 40 mole percent diacid B.

In any embodiment where the diacid B may include at least one of a plurality of diacids B1 or B2, the 70 to 40 mole percent of diacid B refers to any combination of diacids B1 and B2 necessary to equal the required 70 to 40 mole percent of the total number of moles of all the diacid compounds present in polymerized form in the subject copolyester. It will be appreciated by those in the art that the moles of diacid and moles of diol may not be equal due to internal or end repeating blocks of the diacid and/or diol that sometimes may occur in polycondensation reactions.

In any embodiment where a diol-diacid diester or half ester is employed as a reagent, the diol moieties are considered as part of the diol component and the diacid moieties are considered as part of the diacid component. For example, a mole of bis(2-hydroxyethyl)-2,2'-bifuran-5,5'-dicarboxylate (BHEB), although technically a diol, supplies two moles of the diol component, ethylene glycol (EG), also called monoethylene glycol (MEG), and one mole of the diacid component 2,2'-bifuran-5,5'-dicarboxylate (BFE). A diester such as BHEB is considered to be a self-condensing monomer. As a sole reactant, BHEB can be transesterified to form the polyethylene bifuranoate polyester (poly(ethylene-2,2'-bifuran-5,5'-dicarboxylate), (PEBF)) and eliminate the diol (e.g., EG in this example), any excess of which can often be removed by distillation.

Unless indicated otherwise, for purposes herein a semicrystalline polymer is defined as a polymer exhibiting a substantially crystalline melting point, $T_m$, i.e., it has a distinct heat of fusion ($\Delta H_f$) of at least 5 J/g, when determined by a heat/cool/reheat differential scanning calorimetry (DSC) analysis from the second heating ramp by heating of the sample from 30° C. to 300° C. at a heating and cooling rate of 10° C./min and holding the sample for 3 min between heating and cooling scans. For purposes herein, $T_m$, crystallization temperature ($T_a$), glass transition temperature ($T_g$), etc., are determined by DSC analysis from the second heating ramp.

Unless indicated otherwise, inherent viscosity is determined in 0.5% (g/dL) dichloroacetic acid (DCA) solution at 25° C. by means of a CANNON TYPE B glass capillary viscometer, adapted from ASTM method D4603. Inherent viscosity ($\eta_{inh}$) is calculated as the ratio of the natural logarithm of the relative viscosity to the mass concentration of the polymer according to the equation (A):

$$\eta_{inh} = \frac{\ln \eta_{rel}}{c} \qquad (A)$$

where c is the mass concentration of the polymer (g/dL) and $\eta_{rel}$ is the relative viscosity, which is determined according to the equation (B):

$$\eta_{rel} = \frac{\eta}{\eta_0} \qquad (B)$$

where η is the viscosity of the solution and ηo is the viscosity of the neat solvent. Unless otherwise specified, inherent viscosity is expressed as dL/g.

The difunctional hydroxyl compound can be a dihydric alcohol such as, for example, glycols and diols. The term "glycol" as used in this application includes, but is not limited to, diols, glycols, and/or multifunctional hydroxyl compounds. In any embodiment, the difunctional hydroxyl compound may be a cyclic or aromatic nucleus bearing two hydroxyl substituents such as, for example, 2,2%4,4'-tetramethyl-1,3-cyclobutanediol (TMCD), 1,4-cyclohexanedimethanol (CHDM), as the cis or trans isomers, or a combination of cis and trans isomers, hydroquinone bis(betahydroxyethyl) ether, and/or the like.

The following additional abbreviations are used herein: BD is 1,4-butanediol; BFE is dimethyl-2,2'-bifuran-5,5'-dicarboxylate monomer or its as-polymerized form, 2,2'-bifuran-5,5'-dicarboxylate; BFA is 2,2'-bifuran-5,5'-dicarboxylic acid; BFD is 2,2'-bifuran-5,5'-dimethanol; BHEB is bis(2-hydroxyethyl)-2,2'-bifuran-5,5'-dicarboxylate; CDCl₃ is deuterated chloroform; DEG is diethylene glycol (2,2'-oxydi(ethan-1-ol)); DMI is dimethyl isophthalate; DMT is dimethyl terephthalate; FDCA is furan-2,5-dicarboxylic acid; GPC is gel permeation chromatography; HD is 1,6-hexanediol; I or IPA refers to isophthalic acid; NPG is neopentyl glycol, 2,2-dimethyl-1,3-propanediol; PBBF is poly(1,4-butylene-bifuranoate); PD is 1,3-propanediol; PEF is polyethylene furanoate; PEFBF is bifuran-modified polyethylene furanoate; PEN is polyethylene naphthalate; PENBF is bifuran-modified PEN; PET is polyethylene terephthalate; PETBF is bifuran-modified polyethylene terephthalate; SSP is solid state polymerization; T or TPA refers to terephthalic acid; TFA is trifluoroacetic acid; $T_{d,5\%}$ is thermal degradation temperature determined as the temperature at which a sample loses 5 wt % in a thermogravimetric analysis; TFA-d is deuterated trifluoroacetic acid; the letter "d" prior to a chemical name also indicates a deuterated compound; TGA is thermogravimetric analysis; THF is tetrahydrofuran.

Bifuran Modified Polyesters

In an embodiment according to this invention, a bifuran-modified polyester comprises a diacid component and a diol component wherein the diacid component, the diol component, or a combination thereof, comprise a bifuran comonomer in an amount of from 1 to 50 weight percent based on the total weight of the polyester.

The bifuran comonomer preferably comprises a bifuran diacid, preferably 2,2'-bifuran-5,5'-dicarboxylic acid (BFA); a bifuran diester, preferably dialkyl-2,2'-bifuran-5,5'-dicarboxylate (such as dimethyl-2,2'-bifuran-5,5'-dicarboxylate (BFE)); a diol bifuran diester, preferably di(hydroxyalkyl) bifuranoate (such as bis(2-hydroxyethyl)-2,2'-bifuran-5,5'-dicarboxylate (BHEB)); an ester-forming equivalent thereof (including the corresponding acid halides, esters, half-esters, salts, half-salts, anhydrides, and mixed anhydrides); or a combination thereof. The bifuran comonomer can, in theory, also be a polyhydroxyl bifuran, for example, a di(hydroxyalkyl) bifuran such as 2,2'-bifuran-5,5'-dimethanol (BFD).

In any embodiment of the invention, the polyester may include a diacid component comprising a polyfunctional carboxylic acid monomer selected, for example, from terephthalic acid; furan dicarboxylic acid, e.g., 2,5-furan dicarboxylic acid (FDCA); isophthalic acid; naphthalic acid; bibenzoic acid, e.g., 3,4'-biphenyl dicarboxylic acid and/or 4,4'-biphenyl dicarboxylic acid; 1,3-cyclohexanedicarboxylic acid; 1,4-cyclohexanedicarboxylic acid; succinic acid; glutaric acid; adipic acid; azelaic acid; sebacic acid; and the like; ester forming equivalents thereof, e.g., the corresponding acid halides, esters, half-esters, salts, half-salts, anhydrides, and mixed anhydrides; and combinations thereof.

The diol component can comprise a polyhydroxyl compound selected from, for example, the group consisting of: aliphatic polyols, preferably $C_2$-$C_{20}$ alkyl diols, more preferably having from 2 to 10 carbon atoms, e.g., from 2 to 6 carbon atoms); $C_4$-$C_{20}$ cyclic polyols; polyhydroxyl furans, such as 2,5-furan dimethanol; and combinations thereof. As examples, there may be mentioned polyhdroxyl compounds selected from the group consisting of: ethylene glycol (EG), 1,4-butanediol (BD), 1,6-hexanediol (HD), 1,3-propanediol (PD), 2,2,4,4-tetramethyl-1,3-cyclobutanediol (TMCD), 1,4-cyclohexanedimethanol (CHDM), neopentyl glycol (NPG), 1,2-propanediol, 1,5-pentanediol, isosorbide, isoidide, isomannide, 1,3-cyclohexanedimethanol, and combinations thereof. The diol component is preferably EG, BD, HD, and/or PD; and more preferably comprises, consists essentially of, or consists of EG.

A preferred bifuran-modified polyester comprises polyethylene terephthalate (PET) incorporating the bifuran comonomer, preferably wherein the bifuran comonomer is derived from BFA, BFE, and/or BHEB.

Another exemplary bifuran-modified polyester comprises polyethylene furanoate (PEF) incorporating the bifuran comonomer, preferably wherein the bifuran comonomer is derived from BFA, BFE, and/or BHEB.

In any embodiment, the bifuran comonomer can comprise the bifuran diacid in an amount from 2 to 25 mole percent, preferably from 2 to 10 mole percent, based on the total moles of the diacid component. In any embodiment, the bifuran comonomer can comprise the polyhydroxyl bifuran in an amount from 2 to 25 mole percent, preferably from 2 to 10 mole percent, based on the total moles of the diol component.

In any embodiment, the bifuran-modified polyester may be amorphous, but is preferably semicrystalline, i.e., the polyester exhibits a semicrystalline melting peak ($T_m$) with $\Delta H_f$ equal to or greater than 5 J/g on the second heating ramp in a heat/cool/reheat DSC scan over a temperature range from 30° C. to 300° C. with heating and cooling rates of 10° C./min and holding the sample at temperature for 3 min before and after the cooling ramp.

In any embodiment, a reinforced composition can comprise 100 parts by weight of any bifuran-modified polyester described herein and from 1 to 100 parts by weight of a reinforcement material. The reinforcement material is preferably glass fibers, carbon fibers, carbon nanotubes, minerals, or a combination thereof.

In any embodiment, a shaped article can comprise any bifuran-modified polyester or reinforced composition described herein. Preferably, the shaped article is a container, film, fiber, or injection molded part, more preferably a biaxially oriented film, low shrink fibers, a glass fiber-reinforced injection molded part, a carbon fiber-reinforced injection molded part, a carbon nanotube-reinforced injection molded part, a mineral-reinforced injection molded part, or a thermoformed tray.

The bifuran polycarboxylate units and/or bifuran polyhydroxyl units may be used to reduce the oxygen permeability of the bifuran polyester, e.g., the polyester may be formed into an oriented or unoriented film, preferably a biaxially oriented film, having an oxygen permeability less than the base (unmodified) polyester.

The bifuran polycarboxylate units and/or bifuran polyhydroxyl units may be used to increase the $T_g$ of the bifuran modified polyester.

In another aspect of the invention, a method of making a bifuran-modified polyester can comprise esterifying or transesterifying monomers comprising a diacid component and a diol component, optionally in the presence of a catalyst; wherein the monomers further comprise a bifuran comonomer; and polycondensing the esterified or transesterified monomers, optionally in the presence of the catalyst, to form a bifuran-modified polyester comprising the diacid component, the diol component, and the bifuran comonomer, wherein the bifuran comonomer is present in an amount from 1 to 50 weight percent based on the total weight of the bifuran-modified polyester.

Suitable diacid components include polyfunctional carboxylic acid monomer selected from terephthalic acid, furan dicarboxylic acid (including 2,5-furan dicarboxylic acid), isophthalic acid, naphthalic acid, bibenzoic acid (including 3,4'-biphenyl dicarboxylic acid and/or 4,4'-biphenyl dicarboxylic acid), 1,3-cyclohexanedicarboxylic acid, 1,4-cyclohexanedicarboxylic acid, succinic acid, glutaric acid, adipic acid, azelaic acid, and sebacic acid; ester forming equivalents thereof (including the corresponding acid halides, esters, half-esters, salts, half-salts, anhydrides, and mixed anhydrides); and combinations thereof.

Suitable bifuran comonomers used in the method include bifuran diacids, preferably 2,2'-bifuran-5,5'-dicarboxylic acid (BFA); bifuran diesters, preferably dialkyl-2,2'-bifuran-5,5'-dicarboxylate such as dimethyl-2,2'-bifuran-5,5'-dicarboxylate (BFE); diol bifuran diesters, preferably di(hydroxyalkyl) bifuranoate such as bis(2-hydroxyethyl)-2,2'-bifuran-5,5'-dicarboxylate (BHEB); ester-forming equivalents thereof (including the corresponding acid halides, esters, half-esters, salts, half-salts, anhydrides, and mixed anhydrides); or a combination thereof.

Suitable diol components in the method include polyhydroxyl monomers selected from the group consisting of: aliphatic polyols, preferably $C_2$-$C_{20}$ alkyl diols (preferably having from 2 to 10 or from 2 to 6 carbon atoms); $C_4$-$C_{20}$ cyclic polyols; polyhydroxyl furans (such as 2,5-furan dimethanol); and combinations thereof. For example, the polyhydroxyl monomer can be selected from the group consisting of: ethylene glycol (EG), 1,4-butanediol (BD), 1,6-hexanediol (HD), 1,3-propanediol (PD), 2,2,4,4-tetramethyl-1,3-cyclobutanediol (TMCD), 1,4-cyclohexanedimethanol (CHDM), neopentyl glycol (NPG), 1,2-propanediol, 1,5-pentanediol, isosorbide, isoidide, isomannide, 1,3-cyclohexanedimethanol, and combinations thereof. Preferably the diol component is selected from the group consisting of EG, BD, HD, and PD. In an exemplary embodiment, the diol component comprises, consists essentially of, or consists of EG.

For example, the polyfunctional carboxylic acid can comprise terephthalic acid or an ester forming equivalent thereof (including the corresponding acid halides, esters, half-esters, salts, half-salts, anhydrides, and mixed anhydrides), and the polyhydroxyl monomer can comprise EG. In this case, the bifuran-modified polyester comprises polyethylene terephthalate (PET) incorporating the bifuran comonomer, e.g., BFA, BFE, and/or BHEB.

As another example, the polyfunctional carboxylic acid can comprise 2,5-furan dicarboxylic acid or an ester forming equivalent thereof (including the corresponding acid halides, esters, half-esters, salts, half-salts, anhydrides, and mixed anhydrides); and the polyhydroxyl monomer comprises EG. In this example, the bifuran-modified polyester comprises polyethylene furanoate (PEF) incorporating the bifuran comonomer, e.g., BFA, BFE, and/or BHEB.

In any embodiment, the diacid component can comprise a dicarboxylic acid monomer; the bifuran comonomer includes a bifuran dicarboxylic acid and/or a di(hydroxyalkyl) bifuranoate, preferably wherein the bifuran comonomers comprise 2,2'-bifuran-5,5'-dicarboxylic acid (BFA), di(hydroxyalkyl)-2,2'-bifuran-5,5'-dicarboxylate (preferably bis(2-hydroxyethyl)-2,2'-bifuran-5,5'-dicarboxylate (BHEB)), or a combination thereof; and the catalyst, if present, can comprise a Brønsted or Lewis acid.

Esterification and polycondensation of dicarboxylic acid monomers have the advantages of a faster reaction, and it releases water, which does not need to be recycled, is not flammable, and is nontoxic. Esterification allows low diol:diacid ratios closer to stoichiometric, with less diol recycle. The water and excess diol are often removed by distillation. When the diacid component comprises dicarboxylic acid, the bifuran diacid may also be the dicarboxylic acid, e.g., BFA. While catalyst is optional, the kinetics may be improved by using an esterification catalyst such as a Brønsted or Lewis acid. The Brønsted acids may be strong mineral acids such as sulfuric acid, nitric acid, or hydrochloric acid. Suitable Lewis acids include compounds of metals such as the chlorides, bromides, tosylates, alkoxides and triflates of metal selected from the group consisting of titanium, zinc, tin, manganese, zinc, antimony, and mixtures thereof. It is also possible to use organic esters of the metal acids, such as the alkyl esters of titanic acid, stannic acid and the like. Suitable Lewis acids include compounds of metals such as the chlorides, bromides, tosylates, alkoxides and triflates of metal selected from the group consisting of antimony, titanium, zinc, tin, manganese, zinc, aluminum, cobalt, bismuth, germanium, and mixtures thereof. It is also possible to use organic esters of the metal acids, such as the alkyl esters of titanic acid, stannic acid and the like.

In any embodiment, the diacid component can comprise a dialkyl dicarboxylate monomer; and the bifuran comonomer can include a bifuran diester and/or a di(hydroxyalkyl) bifuranoate, preferably wherein the one or more monomers comprise dialkyl-2,2'-bifuran-5,5'-dicarboxylate, di(hydroxyalkyl)-2,2'-bifuran-5,5'-dicarboxylate, or a combination thereof, more preferably wherein the one or more monomers comprise dimethyl-2,2'-bifuran-5,5'-dicarboxylate (BFE) and/or bis(2-hydroxyethyl)-2,2'-bifuran-5,5'-dicarboxylate (BHEB). The catalyst can be metal catalyst, and the metal of the catalyst can be present in an amount of from about 10 to 1500 ppm (preferably from about 100 to 750 ppm or from about 150 to 500 ppm, more preferably from about 200 to 400 ppm), based on the weight of theoretical yield of the bifuran-modified polyester. Preferably, the catalyst comprises a plurality of metal catalysts, wherein the total metal of the catalyst is present in an amount of from about 10 to 1500 ppm, preferably from about 100 to 750 ppm, and more preferably where each metal is individually present at from about 50 to 300 ppm, based on the weight of theoretical yield of the bifuran-modified polyester. The metal of the catalyst is preferably selected from the group consisting of antimony, titanium, zinc, tin, manganese, zinc, aluminum, cobalt, bismuth, germanium, and the like, and mixtures thereof; more preferably one or more of titanium, tin, manganese, zinc, and antimony.

Transesterification and polycondensation of the alkyl diesters of the dicarboxylic acids with the diol, often using a catalyst, eliminates alkyl alcohol, which is often removed by distillation along with any excess diol. For example, when DMT and/or BFE are used, methanol is formed in addition to the polymer or prepolymer. Diesters often have high purity, which can lead to better, and better-defined, polymer properties.

Transesterification catalysts herein may comprise one or a combination of metal catalysts as mentioned above, preferably one or more of titanium, tin, manganese, zinc, antimony and the like. For example, suitable metal catalysts for transesterification and polycondensation can include titanium compounds such as tetraalkyl titanate $Ti(OR)_4$, e.g., tetraisopropyl titanate, tetra-n-butyl titanate, and tetrakis(2-ethylhexyl) titanate, and titanium chelates such as acetylacetonate titanate, ethyl acetoacetate titanate, triethanolamine titanate, lactic acid titanate; bismuth compounds such as bismuth oxide; germanium compounds such as germanium dioxide; zirconium compounds such as tetraalkyl zirconates; tin compounds such as butyl stannoic acid, tin oxides and alkyl tins; antimony compounds such as antimony trioxide and antimony triacetate; aluminum compounds such as aluminum carboxylates and alkoxides, and inorganic acid salts of aluminum; cobalt compounds such cobalt acetate; manganese compounds such as manganese acetate; zinc compounds such as zinc acetate; and combinations thereof. Additionally, a phosphorus compound can be used as a stabilizer. Thus, suitable metal catalyst systems can be based on various combinations of metal systems and/or stabilizers, e.g., Sb/Mn/Zn, Ti/P, Mn/Ti/P, Mn/Ti/Co/P, Zn/Al, Zn/Ti/Co/P, and so on. Suitable metal catalysts are generally commercially available or prepared by known methods.

In any embodiment of the invention, a diol diester such as bis(hydroxyalkyl) bifuranoate, e.g., BHEB, may be employed as a monomer or comonomer. The diol diester can be formed in situ during esterification or transesterification, but is often prepared ex situ with an excess of diol, and optionally isolated and/or purified. The isolated diol diesters can be considered a self-condensing monomer which releases one of the diol groups, or they can be combined with the dicarboxylic acids for esterification, or with the diesters for transesterification.

In any embodiment of the invention, a diol diester such as bis(hydroxyalkyl) bifuranoate, e.g., BHEB, may be employed as a comonomer in the contacting step. The diol diester can be formed in situ during esterification or transesterification, but is often prepared ex situ with an excess of diol, and optionally isolated and/or purified. The isolated diol diesters can be considered a self-condensing monomer which releases one of the diol groups, or they can be combined with the dicarboxylic acids for esterification, or with the diesters for transesterification.

In any embodiment of the invention, the esterification or transesterification and polycondensation can be in a melt phase, which can optionally be followed by pelletization, crystallization, and/or solid state polymerization (SSP).

For preparation of the polyester in the melt, the esterification/transesterification/polycondensation reactors are often equipped with a stirrer, an inert gas inlet, a thermocouple, a distillation column connected to a water-cooled condenser, a water or alcohol separator, and a vacuum connection tube. For example, the equipment and procedures disclosed in U.S. Pat. Nos. 4,093,603 and 5,681,918, incorporated by reference herein, may be adapted for implementing the present invention. The contacting step can be a batch, semi-batch, or continuous process comprising introducing the diacid and diol components and catalyst, when used, into the reactor, and heating to a temperature in the range of from 160° C. to 290° C., preferably from 200° C. to 280° C., depending on the particular diacid, diol and bifuran comonomer components. The temperature is often gradually increased from a range of about 160° C. to 200° C. in the initial reaction stages up to a range of about 260° C. to 290° C. in the later stages, depending on the particular diacid, diol and bifuran comonomer components.

Water or the alkyl alcohol and any excess diol are often removed by distillation at atmospheric or near-atmospheric pressure in the initial stages, and/or with a vacuum applied, e.g., pressures below about 130 Pa (1 mm Hg), for example 13.3-40 Pa, in later stages. An inert gas such as nitrogen is often used to sweep the vapor phase from the reactor to shift the equilibrium and promote high molecular weight polycondensation. If desired, the degree of esterification may be monitored by measuring the amount of esterification acid or alcohol formed and the properties of the polyester, for example, viscosity, hydroxyl number, acid number, and so on. After the melt reaches a suitable viscosity, it is discharged from the reactor and may be directly formed into films or spun into fibers, or may be solidified and pelletized or otherwise formed into chips.

If desired, optional stabilizers may include, for example, phenolic antioxidants such as IRGANOX 1010 or phosphonite- and phosphite-type stabilizers such as tributylphosphite, preferably in an amount from 0 to 1 percent by weight of the reactants. Diethylene glycol (DEG) formation suppressants may include compounds such as choline, tetraethylammonium hydroxide (TEAOH), tetramethylammonium hydroxide (TMAOH), tetrabutylammonium hydroxide, salts of carboxylic acids such as calcium or sodium acetate, basic salts of mineral acids, such as $Na_2SO_4$ and $Na_2HPO_4$, alkali metal hydroxides, such as sodium hydroxide, or the like, preferably in an amount from 0.01 to 1 mmol/mol diacid component. In general, the polyesters may include conventional additives including pigments, colorants, stabilizers, antioxidants, extrusion aids, reheat agents, slip agents, carbon black, flame retardants, anti-stick agents, and mixtures thereof. In any embodiment, the polyester may be combined or blended with one or more modifiers and/or blend polymers including polyamides; e.g., NYLON 6,6® (DuPont), poly(ether-imides), polyphenylene oxides, e.g., poly(2,6-dimethylphenylene oxide), poly(phenylene oxide)/polystyrene blends; e.g., NORYL® (SABIC Innovative Plastics), other polyesters, polyphenylene sulfides, polyphenylene sulfide/sulfones, poly(ester-carbonates), polycarbonates; e.g., LEXAN® (SABIC Innovative Plastics), polysulfones, polysulfone ethers, poly(ether-ketones), combinations thereof, and the like.

Preferably, the method comprises molten esterification or transesterification and polycondensation to form a prepolymer, followed by pelletization, crystallization, and solid state polymerization (SSP). The prepolymer preferably has an inherent viscosity of from about 0.4 to 0.6 dL/g, depending on the diacid, diol, comonomer, and intended use of the polyester. Solid state polymerization of the crystallized prepolymer is often performed in a temperature range from a glass transition temperature of the prepolymer up to a melting temperature of the prepolymer, and can increase the inherent viscosity, preferably to an inherent viscosity of 0.9 dL/g or more. SSP may be used to obtain high molecular weight, e.g., for stretch blow molding of bottles, etc., while minimizing degradation and avoiding the excessively high melt viscosity and/or long residence times needed to achieve the target inherent viscosity or molecular weight in a melt reactor.

For example, the contacting can comprise:
molten esterification or transesterification and polycondensation to form a prepolymer, preferably prepolymer having an inherent viscosity of from about 0.4 to 0.6 dL/g;
pelletizing and crystallizing the prepolymer; and
solid state polymerization of the crystallized prepolymer in a temperature range from a glass transition temperature of the prepolymer up to a melting temperature of the prepolymer to increase the inherent viscosity, preferably to an inherent viscosity of 0.9 dL/g or more.

In any embodiment, SSP can comprise placing the prepolymer in a rotary evaporator and rotating the evaporator, preferably with flowing nitrogen and/or under vacuum. In any embodiment, SSP can comprise placing the prepolymer in a rotary evaporator and rotating the evaporator, preferably with flowing nitrogen and/or under vacuum. Anti-stick agent(s) may be used to inhibit sticking of the prepolymer pellets during SSP. SSP catalyst may be different than the molten esterification/transesterification/polycondensation catalyst and added to the prepolymer pellets, or conveniently it may be the same catalyst and/or may be added to or with the monomers or other prepolymer reactants so that it is already present in the prepolymer. Suitable SSP catalysts may include one or more compounds of metal, such as antimony, manganese, zinc, titanium, or a combination thereof. Preferably, the SSP catalyst comprises antimony oxide, manganese acetate, zinc acetate, or a combination thereof, preferably wherein the total metal of the catalyst is present in an amount of from about 10 to 1500 ppm, more preferably from about 100 to 750 ppm, or from about 150 to 500 ppm, or from about 200 to 400 ppm, or 200 to 300 ppm, based on the weight of the prepolymer.

Additional procedures, equipment, and methods for preparation of polyesters in the melt or by SSP are described in WO 2015/137804A1, WO 2015/137805A1, WO 2015/137806A1, WO 2015/137807A1, and WO 2018/071383A1, which are hereby incorporated herein by reference.

Shaped articles comprising any embodiment of the polymers disclosed herein may generally be produced using thermoplastic processing procedures such as injection molding, calendaring, extrusion, blow molding, extrusion blow molding, injection stretch-blow molding, rotational molding, and so on. For example, the method may comprise reinforcing the bifuran polyester, preferably by combining 100 parts by weight of the bifuran polyester and from 1 to 100 parts by weight of a reinforcement material, preferably glass fibers, carbon fibers, carbon nanotubes, minerals, and the like, including combinations thereof. Or, the method may comprise forming the bifuran polyester into a shaped article, preferably a container, film, fiber, or injection molded part, e.g., a biaxially oriented film, low shrink fibers, a glass-reinforced injection molded part, or a thermoformed tray. In particular, the forming step may comprise injection stretch blow-molding.

EMBODIMENTS

Accordingly, the present invention provides the following embodiments:

1. Bifuran-modified polyester comprising:
    a diacid component;
    a diol component; and
    a bifuran comonomer in an amount of from 1 to 50 weight percent based on the total weight of the polyester.
2. The bifuran-modified polyester of embodiment 1 wherein the bifuran comonomer comprises a bifuran diacid, preferably 2,2'-bifuran-5,5'-dicarboxylic acid (BFA); a bifuran diester, preferably dialkyl-2,2'-bifuran-5,5'-dicarboxylate (such as dimethyl-2,2'-bifuran-5,5'-dicarboxylate (BFE)); a diol bifuran diester, preferably di(hydroxyalkyl) bifuranoate (such as bis(2-hydroxyethyl)-2,2'-bifuran-5,5'-dicarboxylate (BHEB)); an ester-forming equivalent thereof (including the corresponding acid halides, esters, half-esters, salts, half-salts, anhydrides, and mixed anhydrides); or a combination thereof.
3. The bifuran-modified polyester of embodiment 1 or embodiment 2 wherein the bifuran comonomer comprises a polyhydroxyl bifuran, preferably di(hydroxyalkyl) bifuran (such as 2,2'-bifuran-5,5'-dimethanol (BFD)).
4. The bifuran-modified polyester of any preceding embodiment, wherein the diacid component comprises a polyfunctional carboxylic acid monomer selected from terephthalic acid, furan dicarboxylic acid (including 2,5-furan dicarboxylic acid), isophthalic acid, naphthalic acid, bibenzoic acid (including 3,4'-biphenyl dicarboxylic acid and/or 4,4'-biphenyl dicarboxylic acid), 1,3-cyclohexanedicarboxylic acid, 1,4-cyclohexanedicarboxylic acid, succinic acid, glutaric acid, adipic acid, azelaic acid, and sebacic acid, ester forming equivalents thereof (including the corresponding acid halides, esters, half-esters, salts, half-salts, anhydrides, and mixed anhydrides), and combinations thereof.
5. The bifuran-modified polyester of embodiment 4, wherein the bifuran comonomer comprises a bifuran diacid, preferably 2,2'-bifuran-5,5'-dicarboxylic acid (BFA); a bifuran diester, preferably dialkyl-2,2'-bifuran-5,5'-dicarboxylate (such as dimethyl-2,2'-bifuran-5,5'-dicarboxylate (BFE)); a diol bifuran diester, preferably di(hydroxyalkyl) bifuranoate (such as bis(2-hydroxyethyl)-2,2'-bifuran-5,5'-dicarboxylate (BHEB)); an ester-forming equivalent thereof (including the corresponding acid halides, esters, half-esters, salts, half-salts, anhydrides, and mixed anhydrides); or a combination thereof.
6. The bifuran-modified polyester of any preceding embodiment, wherein the diol component comprises a polyhydroxyl compound selected from the group consisting of: aliphatic polyols, preferably $C_2$-$C_{20}$ alkyl diols (preferably having from 2 to 10 or from 2 to 6 carbon atoms); $C_4$-$C_{20}$ cyclic polyols; polyhydroxyl furans (such as 2,5-furan dimethanol); and combinations thereof.

7. The bifuran-modified polyester of embodiment 6, wherein the polyhdroxyl compound is selected from the group consisting of: ethylene glycol (EG), 1,4-butanediol (BD), 1,6-hexanediol (HD), 1,3-propanediol (PD), 2,2,4,4-tetramethyl-1,3-cyclobutanediol (TMCD), 1,4-cyclohexanedimethanol (CHDM), neopentyl glycol (NPG), 1,2-propanediol, 1,5-pentanediol, isosorbide, isoidide, isomannide, 1,3-cyclohexanedimethanol, and combinations thereof, preferably wherein the diol component is selected from the group consisting of EG, BD, HD, and PD; more preferably wherein the diol component comprises, consists essentially of, or consists of EG.

8. The bifuran-modified polyester of any preceding embodiment, comprising polyethylene terephthalate (PET) incorporating the bifuran comonomer, preferably wherein the bifuran comonomer is derived from BFA, BFE, and/or BHEB.

9. The bifuran-modified polyester of any preceding embodiment, comprising polyethylene furanoate (PEF) incorporating the bifuran comonomer, preferably wherein the bifuran comonomer is derived from BFA, BFE, and/or BHEB.

10. The bifuran-modified polyester of any preceding embodiment, wherein the bifuran comonomer comprises a bifuran diacid in an amount from 2 to 25 mole percent, preferably from 2 to 10 mole percent, based on the total moles of the diacid component.

11. The bifuran-modified polyester of any preceding embodiment, wherein the bifuran comonomer comprises a polyhydroxyl bifuran in an amount from 2 to 25 mole percent, preferably from 2 to 10 mole percent, based on the total moles of the diol component.

12. A reinforced composition comprising 100 parts by weight of the bifuran-modified polyester of any preceding embodiment and from 1 to 100 parts by weight of a reinforcement material, preferably glass fibers, carbon fibers, carbon nanotubes, minerals, and combinations thereof, preferably wherein the bifuran comonomer comprises a bifuran diacid in an amount from 2 to 25 mole percent, more preferably from 2 to 10 mole percent, based on the total moles of the diacid component.

13. A shaped article, preferably a container, film, fiber, or injection molded part, comprising the bifuran-modified polyester or reinforced composition of any preceding embodiment, more preferably a biaxially oriented film, low shrink fibers, a glass fiber-reinforced injection molded part, a carbon fiber-reinforced injection molded part, a carbon nanotube-reinforced injection molded part, a mineral-reinforced injection molded part, or a thermoformed tray, preferably wherein the bifuran comonomer comprises a bifuran diacid in an amount from 2 to 25 mole percent, more preferably from 2 to 10 mole percent, based on the total moles of the diacid component.

14. A method of making a bifuran-modified polyester, comprising:
    esterifying or transesterifying monomers comprising a diacid component and a diol component, optionally in the presence of a catalyst;
    wherein the monomers further comprise a bifuran comonomer; and
    polycondensing the esterified or transesterified monomers, optionally in the presence of the catalyst, to form a bifuran-modified polyester comprising the diacid component, the diol component, and the bifuran comonomer, wherein the bifuran comonomer is present in an amount from 1 to 50 weight percent based on the total weight of the bifuran-modified polyester.

15. The method of embodiment 14, wherein the diacid component comprises a polyfunctional carboxylic acid monomer selected from terephthalic acid, furan dicarboxylic acid (including 2,5-furan dicarboxylic acid), isophthalic acid, naphthalic acid, bibenzoic acid (including 3,4'-biphenyl dicarboxylic acid and/or 4,4'-biphenyl dicarboxylic acid), 1,3-cyclohexanedicarboxylic acid, 1,4-cyclohexanedicarboxylic acid, succinic acid, glutaric acid, adipic acid, azelaic acid, and sebacic acid; ester forming equivalents thereof (including the corresponding acid halides, esters, half-esters, salts, half-salts, anhydrides, and mixed anhydrides); and combinations thereof; preferably wherein the bifuran comonomer comprises a bifuran diacid, preferably 2,2'-bifuran-5,5'-dicarboxylic acid (BFA); a bifuran diester, preferably dialkyl-2,2'-bifuran-5,5'-dicarboxylate (such as dimethyl-2,2'-bifuran-5,5'-dicarboxylate (BFE)); a diol bifuran diester, preferably di(hydroxyalkyl) bifuranoate (such as bis(2-hydroxyethyl)-2,2'-bifuran-5,5'-dicarboxylate (BHEB)); an ester-forming equivalent thereof (including the corresponding acid halides, esters, half-esters, salts, half-salts, anhydrides, and mixed anhydrides); or a combination thereof.

16. The method of embodiment 14 or embodiment 15, wherein the diol component comprises a polyhydroxyl monomer selected from the group consisting of: aliphatic polyols, preferably $C_2$-$C_{20}$ alkyl diols (preferably having from 2 to 10 or from 2 to 6 carbon atoms); $C_4$-$C_{20}$ cyclic polyols; polyhydroxyl furans (such as 2,5-furan dimethanol); and combinations thereof.

17. The method of any of embodiments 14-16, wherein the polyhdroxyl monomer is selected from the group consisting of: ethylene glycol (EG), 1,4-butanediol (BD), 1,6-hexanediol (HD), 1,3-propanediol (PD), 2,2,4,4-tetramethyl-1,3-cyclobutanediol (TMCD), 1,4-cyclohexanedimethanol (CHDM), neopentyl glycol (NPG), 1,2-propanediol, 1,5-pentanediol, isosorbide, isoidide, isomannide, 1,3-cyclohexanedimethanol, and combinations thereof, preferably wherein the diol component is selected from the group consisting of EG, BD, HD, and PD; more preferably wherein the diol component comprises, consists essentially of, or consists of EG.

18. The method of embodiment 17, wherein:
    the polyfunctional carboxylic acid comprises terephthalic acid or an ester forming equivalent thereof (including the corresponding acid halides, esters, half-esters, salts, half-salts, anhydrides, and mixed anhydrides);
    the polyhydroxyl monomer comprises EG; and
    the bifuran-modified polyester comprises polyethylene terephthalate (PET) incorporating the bifuran comonomer, preferably wherein the bifuran comonomer comprises BFA, BFE, and/or BHEB.

19. The method of embodiment 17, wherein:
    the polyfunctional carboxylic acid comprises 2,5-furan dicarboxylic acid or an ester forming equivalent thereof (including the corresponding acid halides, esters, half-esters, salts, half-salts, anhydrides, and mixed anhydrides);

the polyhdroxyl monomer comprises EG; and the bifuran-modified polyester comprises polyethylene furanoate (PEF) incorporating the bifuran comonomer, preferably wherein the bifuran comonomer comprises BFA, BFE, and/or BHEB.

20. The method of any of embodiments 14-19, wherein:
the diacid component comprises a dicarboxylic acid monomer;
the bifuran comonomer includes a bifuran dicarboxylic acid and/or a di(hydroxyalkyl) bifuranoate; preferably wherein the bifuran comonomers comprise 2,2'-bifuran-5,5'-dicarboxylic acid (BFA), di(hydroxyalkyl)-2,2'-bifuran-5,5'-dicarboxylate (preferably bis(2-hydroxyethyl)-2,2'-bifuran-5,5'-dicarboxylate (BHEB)), or a combination thereof; and
the catalyst, if present, comprises a Brønsted or Lewis acid.

21. The method of any of embodiments 14-20, wherein:
the diacid component comprises a dialkyl dicarboxylate monomer;
the bifuran comonomer includes a bifuran diester and/or a di(hydroxyalkyl) bifuranoate, preferably wherein the one or more monomers comprise dialkyl-2,2'-bifuran-5,5'-dicarboxylate, di(hydroxyalkyl)-2,2'-bifuran-5,5'-dicarboxylate, or a combination thereof; more preferably wherein the one or more monomers comprise dimethyl-2,2'-bifuran-5,5'-dicarboxylate (BFE) and/or bis(2-hydroxyethyl)-2,2'-bifuran-5,5'-dicarboxylate (BHEB);
the catalyst is present, the catalyst comprises a metal catalyst, and the metal of the catalyst is present in an amount of from about 10 to 1500 ppm (preferably from about 100 to 750 ppm or from about 150 to 500 ppm, more preferably from about 200 to 400 ppm), based on the weight of theoretical yield of the bifuran-modified polyester.

22. The method of embodiment 21, wherein the catalyst comprises a plurality of metal catalysts, wherein the total metal of the catalyst is present in an amount of from about 10 to 1500 ppm, preferably from about 100 to 750 ppm, and more preferably where each metal is individually present at from about 50 to 300 ppm, based on the weight of theoretical yield of the bifuran-modified polyester.

23. The method of embodiment 21 or embodiment 22, wherein the metal of the catalyst is preferably selected from the group consisting of antimony, titanium, zinc, tin, manganese, zinc, aluminum, cobalt, bismuth, germanium, and mixtures thereof; more preferably one or more of titanium, tin, manganese, zinc, and antimony; and 24. The method of any of embodiments 14-23, wherein the esterification or transesterification and polycondensation are in a melt phase.

25. The method of any of embodiments 14-24, comprising:
the esterification or transesterification and polycondensation to form a prepolymer, preferably prepolymer having an inherent viscosity of from about 0.4 to 0.6 dL/g;
pelletizing and crystallizing the prepolymer; and
solid state polymerization of the crystallized prepolymer in a temperature range from a glass transition temperature of the prepolymer up to a melting temperature of the prepolymer to increase the inherent viscosity, preferably to an inherent viscosity of 0.9 dL/g or more.

26. The method of embodiment 25, wherein the solid state polymerization comprises placing the prepolymer in a rotary evaporator and rotating the evaporator, preferably with flowing nitrogen and/or under vacuum;

27. The method of embodiment 25 or embodiment 26, wherein the catalyst is added to the monomers for the esterification, transesterification, or polycondensation;

28. The method of any of embodiments 25-27, wherein the catalyst comprises antimony oxide, manganese acetate, zinc acetate, or a combination thereof, preferably wherein the total metal of the catalyst is present in an amount of from about 10 to 1500 ppm, more preferably from about 100 to 750 ppm, based on the weight of the prepolymer.

29. The method of any of embodiments 14-28, wherein the bifuran comonomer comprises a bifuran diacid, preferably 2,2'-bifuran-5,5'-dicarboxylic acid (BFA); a bifuran diester, preferably dialkyl-2,2'-bifuran-5,5'-dicarboxylate (such as dimethyl-2,2'-bifuran-5,5'-dicarboxylate (BFE)); a diol bifuran diester, preferably di(hydroxyalkyl) bifuranoate (such as bis(2-hydroxyethyl)-2,2'-bifuran-5,5'-dicarboxylate (BHEB)); an ester-forming equivalent thereof (including the corresponding acid halides, esters, half-esters, salts, half-salts, anhydrides, and mixed anhydrides); or a combination thereof.

30. The method of any of embodiments 14-29, wherein the bifuran comonomer comprises a polyhydroxyl bifuran, preferably di(hydroxyalkyl) bifuran (such as 2,2'-bifuran-5,5'-dimethanol (BFD)).

31. The method of any of embodiments 14-30, wherein the bifuran comonomer comprises a bifuran diacid in an amount from 2 to 25 mole percent, preferably from 2 to 10 mole percent, based on the total moles of the diacid component.

32. The method of any of embodiments 14-31, further comprising reinforcing the bifuran-modified polyester, preferably by combining 100 parts by weight of the bifuran-modified polyester and from 1 to 100 parts by weight of a reinforcement material, preferably glass fibers, carbon fibers, carbon nanotubes, minerals, and combinations thereof.

33. The method of any of embodiments 14-32, further comprising forming the bifuran-modified polyester into a shaped article, preferably a container, film, fiber, or injection molded part, more preferably a biaxially oriented film, low shrink fibers, a glass fiber-reinforced injection molded part, a carbon fiber-reinforced injection molded part, a carbon nanotube-reinforced injection molded part, a mineral-reinforced injection molded part, or a thermoformed tray.

34. The method of embodiment 33, wherein the forming comprises injection molding, injection stretch blow-molding, or thermoforming.

EXAMPLES

In these examples, the following procedures and testing conditions were used.

Materials: Dimethyl terephthalate (DMT, ≥99%) and dimethyl isophthalate (DMI, 99%) were obtained from Sigma-Aldrich. Dimethyl 2,2'-bifuran-5,5'-dicarboxylate (BFE) was supplied by ExxonMobil Chemical Company. All diesters were dried under vacuum overnight at 70° C. and stored in a dry box before use. Ethylene glycol (EG, ≥99%) was obtained from Sigma-Aldrich and used as received. Dichloroacetic acid (DCA, ≥99%) was obtained from Alfa Aesar and used as received. Titanium (IV) butoxide (97%) was obtained from Fisher Scientific and dried over magnesium sulfate. Titanium catalyst solution (~0.02 g/mL) was prepared by placing 0.2 g titanium (IV) butoxide into a 10 mL volumetric flask and diluting to the calibration line with 1-butanol. The titanium solution was then transferred to a sealed container and purged with nitrogen for 10 min. Trifluoroacetic acid-d (TFA-d, 99.5 atom % D) was obtained from Sigma-Aldrich. Chloroform-d (CDCl$_3$, 99.8% atom D +0.05% v/v TMS) was obtained from Cambridge Isotope Laboratories, Inc.

NMR analysis: $^1$H NMR spectra were acquired on a Varian Unity 400 MHz spectrometer or a BRUKER AVANCE II 500 MHz instrument with at least 32 scans at 23° C. on polymer samples (~50 mg/mL) dissolved in a binary mixture of TFA-d and CDCl$_3$ (~5:95 v/v).

Viscosity analysis: Inherent viscosity ($\eta_{inh}$) was measured in 0.5% (g/dL) DCA solution at 25° C. by means of a CANNON TYPE B glass capillary viscometer, adapted from ASTM method D4603.

Thermogravimetric analysis: TGA of polymer samples was performed using a Q500 thermogravimetric analyzer (TA Instruments) at a heating rate of 10° C./min from 25° C. to 600° C. under nitrogen.

Compression molding of films: Polymers were melt pressed between two aluminum plates, layered with KAPTON® films using a PHI Q-230H manual hydraulic compression press. Aluminum shims were inserted to control the film thickness. REXCO PARTALL® power glossy liquid mold release agent was applied to the KAPTON® films to facilitate release of the polyesters. Samples were heated at 275° C. for 1 minute for amorphous polyesters or 3 minutes for semi-crystalline polyesters before the top stainless steel plate was added. The plates were then centered in the press and closed until there was no visible gap between plates. After two more minutes of heating at 275° C., four 30-second press-release-press cycles were completed with the first two presses utilizing 44.5 kN (5 tons) force and the last two presses utilizing 89 kN (10 tons) force. After the final press, the aluminum plates were immediately submersed in an ice water bath to quench cool the samples. Films were then isolated and dried in a vacuum oven at 40° C. overnight before further characterizations.

Differential scanning calorimetry: DSC was conducted using a Q2000 differential scanning calorimeter (TA Instruments), calibrated with indium and tin standards. A small piece of polymer film (5-8 mg) analyzed in a TZERO™ pan under a nitrogen atmosphere with heating and cooling rates of 10° C./min from ambient to 300° C. The sample was held at temperature for 3 min between heating and cooling scans. Glass transition temperature ($T_g$) was determined from the midpoint of the transition inflection point on the second heating ramp unless otherwise indicated.

Example 1. Synthesis of T-5-BFE-EG (20 g scale). The reaction was performed in a dry round bottom flask equipped with distillation arm, nitrogen inlet and an overhead stirrer. EG (13.14 g, 0.21 mol), BFE (1.28 g, 0.005 mol) and DMT (18.92 g, 0.10 mol) were charged into the flask with enough titanium catalyst solution to make up 40 ppm Ti by weight to the theoretical yield. Oxygen and moisture were removed from the flask by applying vacuum and purging with nitrogen three times. For the transesterification step, stirring rate was set to 200 rpm and the flask was submerged into a 190° C. metal bath for 3 h. The temperature was then ramped to 280° C. while slowly applying vacuum over 30 min. The polycondensation step was then carried out with a 30-40 rpm stirring rate under decreased pressure (≤0.3 mmHg) for 40 min. The flask was then removed from the metal bath and allowed to cool to room temperature. The polyester was isolated by breaking the flask and removing the polyester from the stir rod using a hammer, chisel, and end nippers. Isolated polymer was rinsed with DI water and dried overnight in a vacuum oven at 10-20° C. above the glass transition of the polymer. Analysis showed 5.8 mol % BFE (H$^1$ NMR); $\eta_{inh}$ 0.54 dL/g; $T_g$ 82° C.; $T_m$ 246° C.; $\Delta H_f$ 37 J/g; Tc 150° C.; $T_{d,5\%}$ 386° C.

Example 2. Synthesis of T-5-BFE-EG Copolyester (10 g scale). Polymerization was carried out by adding DMT (9.46 g, 0.95 mol eq.), BFE (0.64 g, 0.05 mol eq.) and EG (12.73 g, 4 mol eq.) to a dry 100 mL round bottom flask equipped with overhead stirrer, distillation arm and nitrogen inlet. Catalyst was added as antimony(III) oxide (250 ppm Sb to the theoretical yield), zinc(II) acetate (100 ppm Zn to the theoretical yield) and manganese(II) acetate (100 ppm Mn to the theoretical yield). The reaction flask as then degassed with vacuum and purged with nitrogen three times to remove air. The reaction flask was submerged in a 180° C. molten metal bath and stirred at 200 rpm for 1 h under nitrogen purge. The temperature was then increased to 200° C. for 1 h and then 220° C. for 2 h. The metal bath temperature was then set to 260° C. and vacuum was slowly applied as the temperature increased over a 15 min period until a final pressure of 0.1-0.3 mmHg was achieved. Stirring continued at 30 rpm for an additional 1 h at which point the flask was removed from the metal bath and allowed to cool. Polymer was isolated by breaking the flask and was then rinsed with water and dried overnight in a 150° C. vacuum oven. Copolyester appeared opaque/off-white and was measured to have an $\eta_{inh}$ value of 0.69 dL/g.

Example 3. Synthesis of T-10-BFE-EG Copolyester (10 g scale). Copolyester made with 10 mol % BFE was synthesized using the same procedure as example 2 except for the following: Polymerization was carried out by adding DMT (7.95 g, 0.90 mol eq.), BFE (1.27 g, 0.10 mol eq.) and EG (12.55 g, 4 mol eq.) to a dry 100 mL round bottom flask equipped with overhead stirrer, distillation arm and nitrogen inlet. Copolyester appeared translucent/yellow and was measured to have an $\eta_{inh}$ value of 0.57 dL/g.

Example 4. Synthesis of FDCA-5-BFE-9-DEG-91-EG Copolyester (10 g scale). Copolyester made with furan-2,5-dicarboxylic acid (FDCA) was synthesized using the same procedure as example 2 except for the following: Polymerization was carried out by adding FDCA (7.00 g, 0.95 mol eq.), BFE (0.68 g, 0.05 mol eq.) and EG (13.39 g, 4 mol eq.) to a dry 100 mL round bottom flask equipped with overhead stirrer, distillation arm and nitrogen inlet. Copolyester appeared opaque/dark brown and was measured to have an $\eta_{inh}$ value of 0.56 or 0.57 dL/g. Diethylene glycol (DEG) formed in situ from EG. $T_m$ and $\Delta H_f$ were observed in the first melt, but not in the second.

Composition and thermal properties of the copolymers are summarized in Table 1.

TABLE 1

Summary of compositional and thermal analyses of BF-modified polyesters

| Polymer | $T_g$ (° C.) | $T_m$ (° C.) | $T_c$ (° C.) | $\Delta H_f$ (J/g) | Composition[2] (mol %) | $T_{d,5\%}$ (° C.) | $\eta_{inh}$ (dL/g) |
|---|---|---|---|---|---|---|---|
| Example 1 | 82 | 246 | 150 | 37.0 | 5.8% BFE | 386 | 0.54 |
| Example 2 | 83 | 241 | 155 | 33.6 | 5% BFE | 385 | 0.69 |
| Example 3 | 84 | 229 | 168 | 22.7 | 11% BFE | 372 | 0.57 |
| Example 4 | 88 | 184[1] | N/O | 31.9[1] | 3% BFE, 9% DEG | 340 | 0.56 |

N/O = not observed;
[1] measured from first heat, no melting observed on second heat;
[2] from $^1$H NMR.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

What is claimed is:

1. A bifuran-modified polyester wherein the bifuran-modified polyester is polyethylene-terephthalate-co-(2,2'-bifuran-5,5'-dicarboxylate) prepared by a method comprising: esterifying or transesterifying a diacid component comprising from 2 to 10 mole percent 2,2'-bifuran-5,5'-dicarboxylate and a diol component with a catalyst compound comprising metal present in an amount of from about 10 to about 450 ppm, based on the weight of the modified bifuran polyester; and polycondensation to form the modified bifuran polyester; and wherein the bifuran modified polyester has:
   an inherent viscosity of at least 0.5 g/dL,
   a melting temperature (Tm) between 229° C. and 246° C.,
   a glass transition temperature (Tg) of 82° C. or more, and
   a semicrystalline melting peak (Tm) with ΔHf equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.

2. The bifuran-modified polyester of claim 1, wherein the metal comprises titanium present in an amount up to about 100 ppm, based on the weight of the bifuran-modified polyester.

3. The bifuran-modified polyester of claim 1, wherein the metal comprises antimony, zinc, and manganese, in amounts up to about 250 ppm, about 100 ppm, and about 100 ppm, respectively, based on the weight of the bifuran-modified polyester.

4. The bifuran-modified polyester of claim 1, comprising from 5 to 10 mole percent 2,2'-bifuran-5,5'-dicarboxylate, based on the total moles of the diacid component.

5. A reinforced composition comprising 100 parts by weight of the bifuran-modified polyester of claim 1 and from 1 to 100 parts by weight of a reinforcement material.

6. A shaped article, comprising the bifuran-modified polyester of claim 1.

7. A method of making the bifuran-modified polyester of claim 1, comprising:
   esterifying or transesterifying monomers comprising the diacid component and the diol component in the presence of the catalyst compound comprising metal present in an amount of from about 10 to about 450 ppm, based on the weight of the modified bifuran polyester;
   wherein the diacid component comprises terephthalate and from 2 to 10 mole percent of the 2,2'-bifuran-5,5'-dicarboxylate comonomer; and
   polycondensing the esterified or transesterified monomers to form the bifuran-modified polyester having:
   an inherent viscosity of at least 0.5 d/dL,
   a glass transition temperature (Tg) of 82° C. or more, and
   a semicrystalline melting peak (Tm) with ΔHf equal to or greater than 5 J/g on the second heating ramp in a heat/cool/reheat differential scanning calorimetry (DSC) scan over a temperature ran e from 30° C. to 300° C. with heating and cooling rates of 10° C./min and holding the sample at temperature for 3 min before and after the cooling ramp.

8. The method of claim 7, wherein the esterification or transesterification and polycondensation are in a melt phase.

9. The method of claim 7, comprising:
   the esterification or transesterification and polycondensation to form a prepolymer;
   pelletizing and crystallizing the prepolymer; and
   solid state polymerization of the crystallized prepolymer in a temperature range from a glass transition temperature of the prepolymer up to a melting temperature of the prepolymer to increase the inherent viscosity.

10. The method of claim 7, wherein the 2,2'-bifuran-5,5'-dicarboxylate comprises from 5 to 10 mole percent of the diacid component, based on the total moles of the diacid component.

11. The method of claim 7, further comprising reinforcing the bifuran-modified polyester.

12. The method of claim 7, further comprising forming the bifuran-modified polyester into a shaped article.

13. The method of claim 12 wherein the forming comprises injection molding, injection stretch blow-molding, or thermoforming.

14. The method of claim 7, wherein the metal comprises titanium in an amount up to about 40 ppm, based on the weight of the bifuran-modified polyester.

15. The method of claim 7, wherein the metal comprises antimony, zinc, and manganese, in amounts up to about 250 ppm, about 100 ppm, and about 100 ppm, respectively, based on the weight of the bifuran-modified polyester.

* * * * *